Nov. 13, 1934. C. A. ERTOLA ET AL 1,980,477

SPOON

Filed Oct. 30, 1933

INVENTORS.
CHARLES A. ERTOLA,
ARTHUR L. SLEE.
BY
THEIR ATTORNEY.

Patented Nov. 13, 1934

1,980,477

UNITED STATES PATENT OFFICE 1,980,477

SPOON

Charles A. Ertola and Arthur L. Slee, San Francisco, Calif.

Application October 30, 1933, Serial No. 695,793

4 Claims. (Cl. 30—22)

Our invention relates to improvements in spoons for administering food and medicine to refractory infants and recumbent patients too sick to be distuurbed, wherein the bowl of a spoon is provided with a flexible convexo-concavo cover operating in conjunction with a pivotally mounted lever for moving said cover to close said bowl to retain the contents therein when said spoon is tilted and to either remove said cover to permit medicine and other contents to flow therefrom into the mouth of a recumbent patient without disturbing said recumbency or to flex said cover into said bowl to extrude said contents whereby forced feeding may be facilitated.

The primary object of our invention is to provide a new and improved article of manufacture comprising a spoon adapted to retain the bowl contents when said spoon is tilted.

A further object is to provide a new and improved article of manufacture comprising a pair of pliers having a spoon or bowl formed upon one jaw and a flexible cover formed upon the opposite jaw thereof whereby said cover may be moved to cover or uncover said bowl and also be flexed thereinto for the purpose of extruding the contents of said bowl.

A further object is to provide a new and improved feeding spoon for administering medicine and the like to recumbent patients too sick to be disturbed without spilling said medicine or disturbing the recumbency of said patient.

A still further object is to provide a spoon having improved means for preventing the spilling of the contents of said spoon when the same is tilted or suddenly jarred, as when forcibly administering food or medicine to refractory infants or others.

We accomplish these and other objects by means of the improved device disclosed in the drawing, in which—

Figure 1:
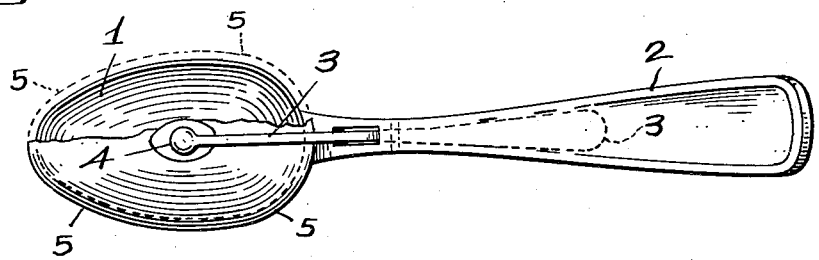
Fig. 1 is a plan view of the improved spoon with a portion of the cover broken away.

Referring to the drawing:

The numeral 1 is used to designate the bowl of a spoon and 2 the handle thereof. A lever 3 is pivotally mounted upon the handle 2 at a point conveniently adjacent the bowl 1 so that the lips may be easily and readily closed around the device when in covered or extruding positions, as hereinafter more fully set forth.

One free end of the lever 3 is preferably positioned directly over the bowl 1 and is connected by means of a suitable universal joint 4 to a convexo-concavo flexible cover 5, the concaved portion or surface of said cover 5 being arranged to embrace the contour or edge of the bowl 1 so as to effectively form a closure for said bowl 1 to prevent spilling of the contents of said bowl when the spoon is tilted, as when administering medicine or other matter to a recumbent patient, or to a refractory infant or child.

The lever 3 may be short, as disclosed in full lines in the drawing, or may be extended as indicated in dotted lines 3' in order to secure greater leverage for extruding more solid material.

Figure 2:
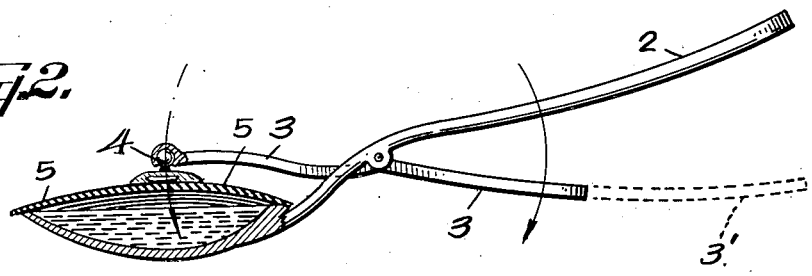
Fig. 2 is a broken side elevation, with the bowl and cover in section.

In operation, the cover 5 is raised from the bowl 1 by moving the lever 3 in the direction indicated by the right hand arrow in Fig. 2 of the drawing, and the bowl 1 may then be filled with the required matter to be fed or dispensed.

The lever 3 is then moved in the direction of the opposite arrow to close the cover 5 upon the bowl 1 as disclosed in Fig. 2 of the drawing, and the spoon may then be tilted without spilling the contents of the bowl thereof as when administering to a recumbent patient and without disturbing said patient's recumbency or causing him to make any movement which might disturb him. After the spoon has been inserted within the patient's mouth, the lever 3 is then moved to displace the cover 5 from the bowl 1 and the contents of said bowl may then freely flow into the patient's mouth, after which the spoon may be easily removed.

When feeding medicine or the like to refractory children or infants the cover 5 will prevent the contents of the bowl 1 from being spilled in case said refractory child rebels and slaps the spoon, as refractory children have been known to do.

Figure 3:
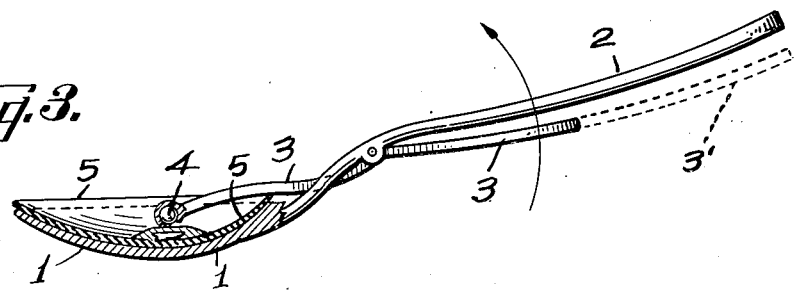
Fig. 3 is a similar view, disclosing the cover flexed into the bowl of the spoon for extruding the contents of said bowl.

Instead of merely removing the cover the lever 3 may be operated, as in the case of closing a pair of pliers, to flex the flexible cover 5 into the bowl 1 of the spoon, as disclosed in Fig. 3 of the drawing, and thereby forcibly extrude the contents of said bowl 1 after the same has been placed within the recipient's mouth.

Having described our invention we claim—

1. A new article of manufacture comprising a pair of pliers having a bowl formed upon one jaw thereof; and a flexible cover mounted upon the other jaw of said pliers for covering said bowl, said cover being arranged to be moved into said bowl when said pliers are closed to extrude the contents of said bowl therefrom.

2. A new article of manufacture comprising a pair of pliers having a bowl formed upon one jaw; and a flexible cover universally mounted upon the other jaw and arranged to cover said bowl to retain the contents of said bowl therein, and to be pressed into said bowl to extrude said contents when said pliers are fully closed.

3. A new article of manufacture comprising a pair of pliers having a bowl formed upon one jaw thereof, and a flexible convexo-concaved cover mounted in connection with the other jaw and arranged to cover said bowl to retain the contents therein and to be flexed into said bowl to extrude said contents when said pliers are fully closed.

4. The combination with a spoon of a lever pivotally mounted in the handle thereof and having a free end extending over the bowl of said spoon; and a flexible convexo-concavo cover universally mounted upon said free end of the lever and arranged to be moved thereby to cover said bowl to retain contents therein when said spoon is tilted and to be flexed into said bowl by said lever to extrude said contents from said bowl whereby said contents may be administered to a recumbent patient without disturbing said recumbency.

CHARLES A. ERTOLA.
ARTHUR L. SLEE.